US009652390B2

(12) United States Patent
Gu et al.

(10) Patent No.: US 9,652,390 B2
(45) Date of Patent: May 16, 2017

(54) MOVING DATA BETWEEN CACHES IN A HETEROGENEOUS PROCESSOR SYSTEM

(71) Applicant: Advanced Micro Devices, Inc., Sunnyvale, CA (US)

(72) Inventors: JunLi Gu, Beijing (CN); Bradford M. Beckmann, Redmond, WA (US); Yuan Xie, State College, PA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 125 days.

(21) Appl. No.: 14/452,058

(22) Filed: Aug. 5, 2014

(65) Prior Publication Data

US 2016/0041909 A1    Feb. 11, 2016

(51) Int. Cl.
*G06F 12/00* (2006.01)
*G06F 13/00* (2006.01)
*G06F 12/0813* (2016.01)
*G06F 12/0811* (2016.01)

(52) U.S. Cl.
CPC ...... *G06F 12/0813* (2013.01); *G06F 12/0811* (2013.01); *G06F 2212/154* (2013.01); *G06F 2212/283* (2013.01)

(58) Field of Classification Search
CPC ......... G06F 17/30902; G06F 17/30132; G06F 12/0802; G06F 2201/885; G06F 12/0811; G06F 12/0868; G06F 12/0888; G06F 12/0871; G06F 12/122; G06F 2212/1024; G06F 9/30043; G06F 12/123;
(Continued)

(56) References Cited

U.S. PATENT DOCUMENTS

| 7,934,054 B1* | 4/2011 | Moll ...................... G06F 1/3203 345/541 |
| 2003/0009643 A1* | 1/2003 | Arimilli .............. G06F 12/0813 711/155 |
| 2004/0111563 A1 | 6/2004 | Edirisooriya et al. |

(Continued)

FOREIGN PATENT DOCUMENTS

WO    2010-096263 A2    8/2010

OTHER PUBLICATIONS

PCT Search Report and Written Opinion, PCT/US2015/043620, Dec. 23, 2015, 11 pages.

*Primary Examiner* — David X Yi
*Assistant Examiner* — Candice Rankin
(74) *Attorney, Agent, or Firm* — Volpe and Koenig, P.C.

(57) ABSTRACT

Apparatus, computer readable medium, integrated circuit, and method of moving a plurality of data items to a first cache or a second cache are presented. The method includes receiving an indication that the first cache requested the plurality of data items. The method includes storing information indicating that the first cache requested the plurality of data items. The information may include an address for each of the plurality of data items. The method includes determining based at least on the stored information to move the plurality of data items to the second cache. The method includes moving the plurality of data items to the second cache. The method may include determining a time interval between receiving the indication that the first cache requested the plurality of data items and moving the plurality of data items to the second cache. A scratch pad memory is disclosed.

12 Claims, 7 Drawing Sheets

(58) Field of Classification Search
CPC .............. G06F 12/0893; G06F 12/0897; G06F 11/073; G06F 12/02
See application file for complete search history.

(56) References Cited

U.S. PATENT DOCUMENTS

| | | |
|---|---|---|
| 2005/0080998 A1 | 4/2005 | Day et al. |
| 2009/0172353 A1* | 7/2009 | Su ........................... G06F 8/456 712/30 |
| 2011/0119450 A1 | 5/2011 | Choi et al. |
| 2014/0040552 A1 | 2/2014 | Rychlik et al. |
| 2014/0205012 A1* | 7/2014 | Lee ....................... H04N 19/42 375/240.16 |
| 2014/0325155 A1* | 10/2014 | Marshall ............. H04L 67/2885 711/122 |
| 2015/0172224 A1* | 6/2015 | Zaifman ............... H04L 49/552 370/394 |
| 2015/0347302 A1* | 12/2015 | Hagersten ........... G06F 12/0862 711/122 |

\* cited by examiner

```
301: main() {
302:    data = malloc(...);
303:    initialize (data);
304:    do {
305:        kernel <<<blocks, threads>>>(data);
306:        re-processes(data);
307:    } while (work left);
308:    post-process(data);
```

FIGURE 3A 300.2

```
351: kernel () {
352: process(data);
353: }
```

MOVING DATA BETWEEN CACHES IN A HETEROGENEOUS PROCESSOR SYSTEM

TECHNICAL FIELD

The disclosed embodiments are generally directed to moving data into caches, and in particular, to moving data into caches in a heterogeneous processor system before the data is requested.

BACKGROUND

Some systems have heterogeneous processors. For example, a system with a central processing unit (CPU) and multiple cores (hereinafter "CPUs" and "cores" may be used interchangeably), may also include graphical processing units (GPUs), which often include multiple cores (hereinafter "GPUs" and "cores" may be used interchangeably). The CPUs and the GPUs may share the same memory, which often includes caches. Caches are smaller portions of the memory that require less time to access than the main memory and often are privately used by one or more processors. Portions of the main memory are copied into the caches of the CPUs and GPUs. The multiple copies of the portions of main memory being used by different processors require methods for how to keep the caches and main memory consistent or coherent with one another. Often, in a heterogeneous system, data is moved between the cache of the first processor type such as the CPU and the cache of the second processor type such as the GPU.

SUMMARY OF EMBODIMENT(S)

Apparatuses, computer readable media, integrated circuits, and methods of moving a plurality of data items to a first cache or a second cache are presented. The method includes receiving an indication that the first cache requested the plurality of data items. The method may include storing information indicating that the first cache requested the plurality of data items. The information may include an address for each of the plurality of data items. The method may include determining, based at least on the stored information, to move the plurality of data items to the second cache, and moving the plurality of data items to the second cache. The method may include determining a time interval between receiving the indication that the first cache requested the plurality of data items and moving the plurality of data items to the second cache. A scratch pad memory is also disclosed.

A system for moving a plurality of data items to a first cache or a second cache is disclosed. The system is configured to receive an indication that the first cache requested the plurality of data items. The system is configured to store information indicating that the first cache requested the plurality of data items. The information may include an address for each of the plurality of data items. The system is configured to determine, based at least on the stored information, to move the plurality of data items to the second cache. The system is configured to move the plurality of data items to the second cache.

An integrated circuit (IC) for moving a plurality of data items to a first cache or a second cache is disclosed. The IC includes a scratch pad memory configured to store one or more data items with an address associated with each of the one or more data items. The IC may include a first cache configured to store one or more data items, and which is configured to write through a data item of the one or more data items to the scratch pad memory. The IC includes a second cache configured to store the one or more data items, and which is also configured to write through the data item of the one or more data items to scratch pad memory. The IC may include a communications detector configured to move the data item from the scratch pad memory to the second cache based on determining that the data items will be requested by a processor associated with the second cache based on the data item being in the first cache.

BRIEF DESCRIPTION OF THE DRAWINGS

A more detailed understanding may be had from the following description, given by way of example in conjunction with the accompanying drawings wherein.

DETAILED DESCRIPTION OF EMBODIMENT(S)

Figure 1:
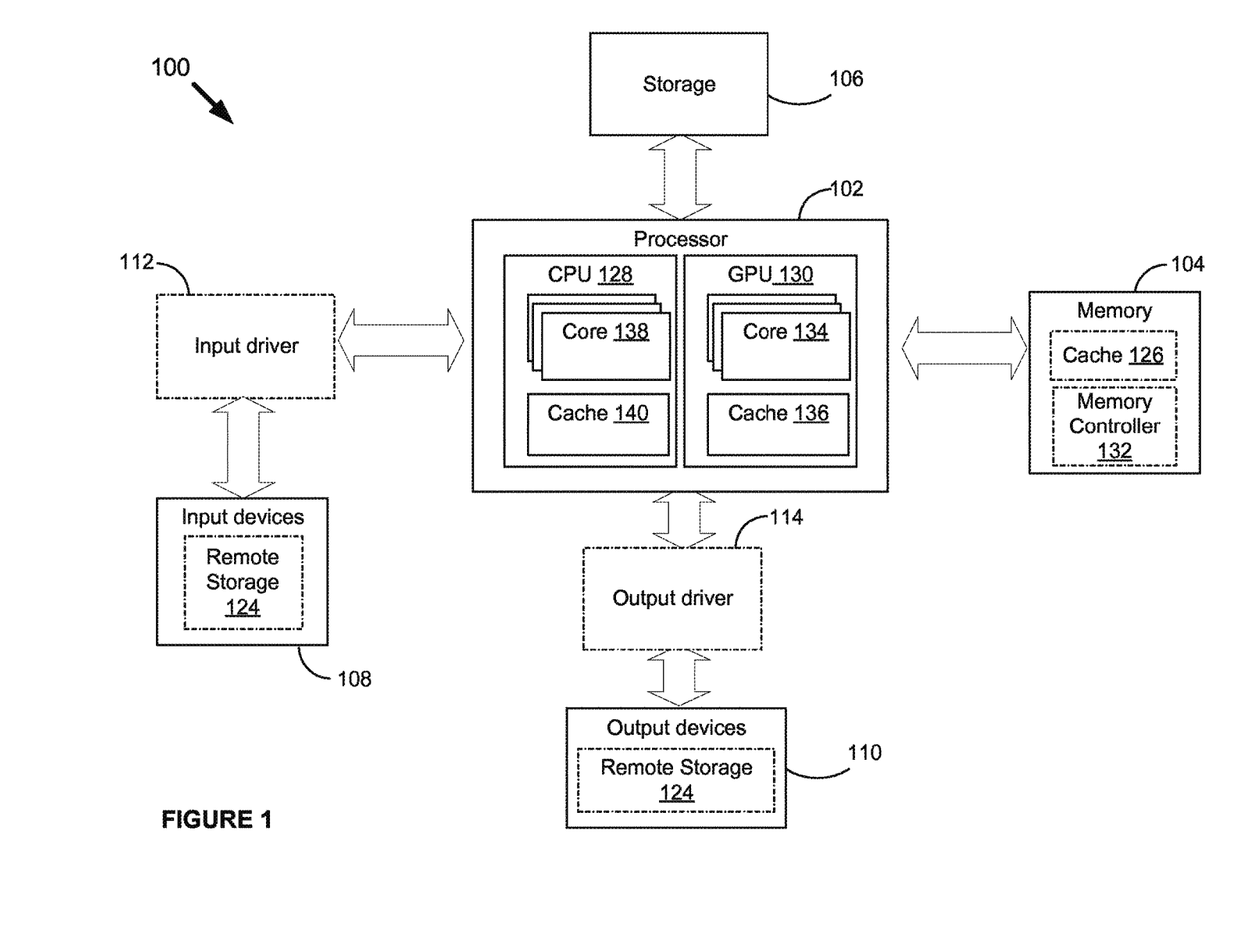
FIG. 1 is a block diagram of an example device in which one or more disclosed embodiments may be implemented.

FIG. 1 is a block diagram of an example device 100 in which one or more disclosed embodiments may be implemented. Example devices 100 include a computer, a gaming device, a handheld device, a set-top box, a television, a mobile phone, or a tablet computer. The device 100 includes a processor 102, a memory 104, storage 106, one or more input devices 108, and one or more output devices 110. Optionally, the device 10 includes an input driver 112 and an output driver 114. It is understood that the device 100 may include additional components not shown in FIG. 1.

As illustrated, the processor 102 includes processing units of different types—e.g., one or more central processing units (CPU) 128, which includes one or more cores 138 (i.e., a first processor type), and one or more graphics processing unit (GPU) 130, which includes one or more cores 134 or GPU cores (i.e., a second processor type). As known to those of ordinary skill in the art, processors of types different than the CPU and GPU are known. These other processors include, for example, digital signal processors, application processors and the like. The CPU 128 and GPU 130 may be located on the same die, or multiple dies. The GPU 130 may include a command processor (not illustrated) that controls one or more cores 134. The cores 134 each may include two or more processing elements (not illustrated) that perform as single instruction multiple data (SIMD) processing elements.

The CPU 128 includes one or more cores 138 and one or more caches 140. The GPU 130 includes one or more cores 134 and one or more caches 136. The CPU 128 and GPU 130 may be located on the same die, or multiple dies. Each processor core may be a CPU 128 and each core may be a GPU 130. The GPU 130 includes one or more cores 134 and one or more caches 136. The GPU 130 and the CPU 128 may be other types of computational units. In some embodiments, a computational unit includes a portion of the die that generates a memory request. The memory 104 may be located on the same die as the processor 102, or may be located separately from the processor 102. The memory 104 may include a volatile or non-volatile memory, for example, random access memory (RAM), dynamic RAM (DRAM), or a cache. The memory 104 includes one or more memory controllers 132 and one or more caches 126. The memory controller 132 may be located on the same die as the CPU or another die. The caches 126 may be associated with the processor 102 or associated with the memory 104. The caches 126 and memory 104 includes communication lines (not illustrated) for providing coherency to the cache 126 and memory 104. The caches 126 and memory 104 include a directory (not illustrated) for providing cache coherency as disclosed below. In some embodiments, the caches 126 include controllers (not illustrated) that are configured for coherency protocols.

The storage 106 may include a fixed or removable storage, for example, a hard disk drive, a solid state drive, an optical disk, or a flash drive. Example input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals or blue tooth). Example output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 are optional components.

Figure 2:
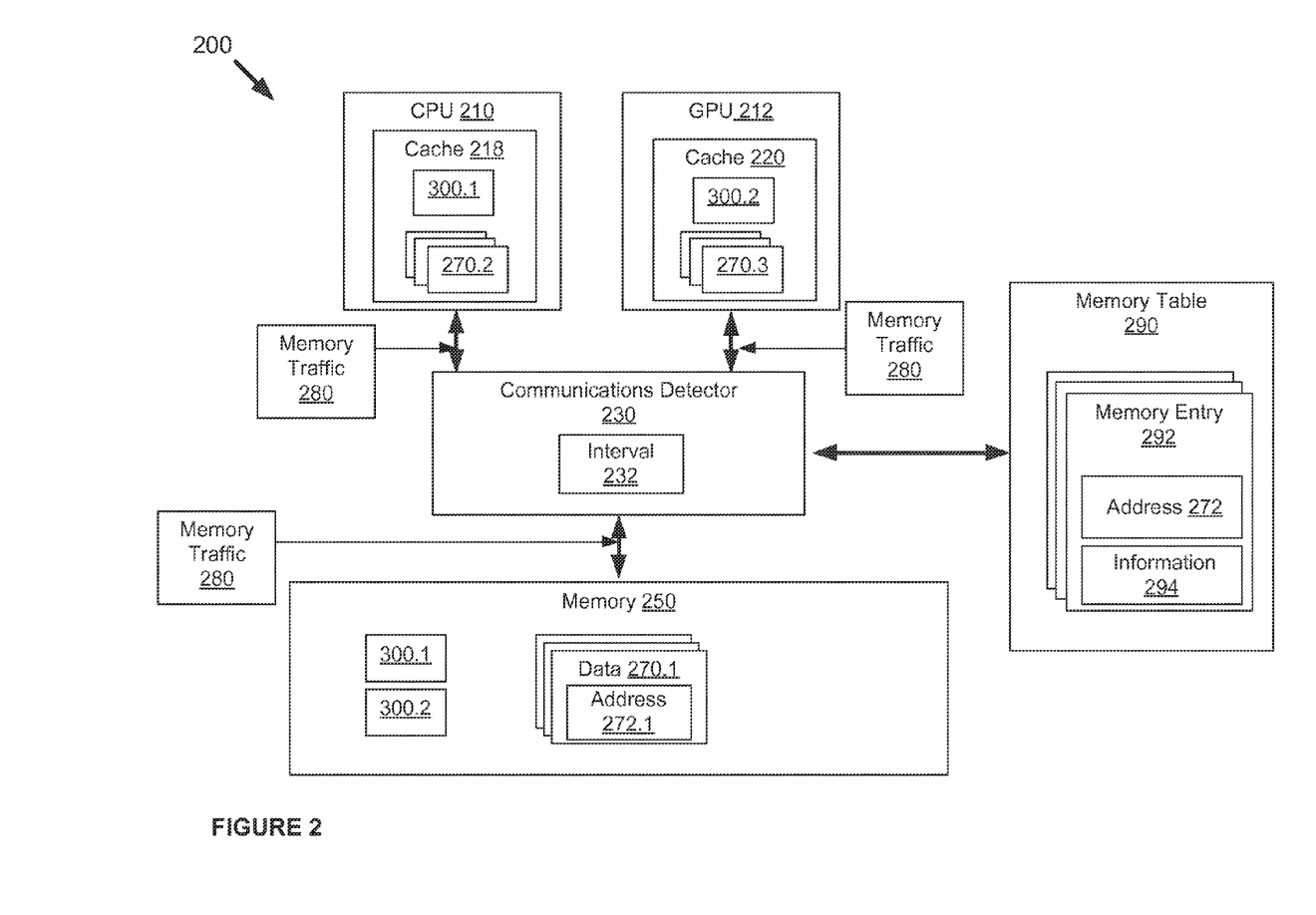
FIG. 2 is a schematic diagram illustrating an example of an apparatus for cache injection in a heterogeneous processor system, in accordance with some embodiments.

FIG. 2 is a schematic diagram illustrating an example of a system 200 for cache injection in a heterogeneous processor system, in accordance with some embodiments. Illustrated in FIG. 2 are a CPU 210, GPU 212, cache communications detector 230, memory table 290, memory traffic 280, and memory 250. The communications detector 230 monitors at least some of the memory traffic 280 and determines whether or not to move data 270 into the cache 218 of the CPU 210 or the cache 220 of the GPU 212 based on the memory traffic 280.

The CPU 210 includes a cache 218. The CPU 210 is a processing unit of the first processor type such as the CPU 128. The cache 218 is a cache 218 that stores data 270.2 and/or instructions 300.1 (see FIG. 3A) for the CPU 210 to consume. The CPU 210 executes the instructions 300.1 which may include instructions for processing the data 270.2. The instructions 300.1 are based on the pseudo-code of FIG. 3A or other suitable instructions.

The GPU 212 includes a cache 220. The GPU 212 is a processing unit of the second processor type such as the GPU 130. The cache 220 is a cache 220 that stores data 270.3 and/or instructions 300.2 (see FIG. 3B) for the GPU 212 to process. The GPU 212 executes the instructions 300.2 which may include instructions for processing the data 270.3. The instructions 300.2 may be based on the pseudo-code of FIG. 3B or other suitable instructions.

The memory table 290 is a table that includes memory entries 292. The memory entries 292 include an address 272 and information 294. The memory table 290 is stored in memory 250 or in another location accessible to the communication detector 230. For example, the communication detector 230 may have a cache (not illustrated) associated with the communication detector 230 for storing the memory table 290 or other data. The address 292 is an address of the memory entry 292. The information 294 includes information regarding the memory entry 292. For example, the information 294 may be information 294 such as information 294 that indicates that the memory entry 292 with address 272 was loaded into cache 218. In some embodiments, the information 294 includes a counter of the number times data 270 has been moved between cache 218 and cache 220. In some embodiments, the communication detector 230 uses a different data structure than a memory table 290.

The communication detector 230 determines and/or stores an interval 232. In some embodiments, the interval 232 is a time interval 232 between when data 270 was loaded into cache 218 and when data 270 was requested by cache 220. The communication detector 230 is configured to move data 270 into the cache 218 of the CPU 210 and/or the cache 220 of the GPU 212. The communication detector 230 monitors the memory traffic 280 and anticipates when the cache 218 of the CPU 210 and/or the cache 220 of the GPU 212 need data 270 prior to the cache 218 and/or cache 220 requesting the data 270. The communication detector 230 monitors the memory traffic 280 by maintaining a memory table 290. The communication detector 230 maintains in the memory table 290 memory entries 292. The communication detector 230 maintains information 294 such as information 294 regarding which cache 218, 220 the data 270 is currently residing, an indication of how often the data 270 has been used, and other information that may be useful for the communications detector 230 to determine whether or not to move data 272 associated with the address 272 to a cache 218, 220.

The communications detector 230 is configured to detect movement of data 270 between the cache 218 of the CPU 210 and the cache 220 of the GPU 212. The communications detector 230 determines an interval 232 between when data 270 is moved from the cache 218 of the CPU 210 to the cache 220 of the GPU 212 or vice versa and based on the determined interval 232 move data to a cache 218. For example, the communications detector 230 monitors memory traffic 280 and maintains a memory table 290. The memory table 290 may include memory entries 292 that indicate when data 270 was loaded into cache 218. The communications detector 230 then monitors the memory traffic 280 to determine when the cache 220 requests the data 270 corresponding to memory entries 292. The communication detector 230 determines the interval 232 between when the memory entries 292 were requested by, or loaded into, the cache 218 and when the memory entries 218 were requested by or loaded into the cache 220.

The data 270 may move between the cache 218 of the CPU 210 and the cache 212 of the GPU 212 more than once. The communication detector 230 uses the determined interval 232 to determine when to move data 270 from one cache 218, 220 to another cache 218, 220. The communication detector 230 moves data 270 into a cache 218 by sending a command to the memory 250 to load the cache 218, 220 with the data 270.

The communications detector 230 may be implemented as part of the memory 250, CPU 210, and/or GPU 212. The communications detector 230 may be implemented by software, firmware, or an electronic circuit. The communications detector 230 may be implemented with more than one part. For example, the communication detector 230 may have a part associated with the memory 250 and a part associated with the CPU 210. The communications detector 230 may be part integrated circuit and part software or firmware.

The caches 218, 220 may be write back caches. The caches 218, 220 may be write-through caches. The caches 218, 220 may be part of a coherent cache system.

The memory 250 includes a directory and other caches (not illustrated). The memory 250 is part of a central memory hierarchy with the caches 218, 220 part of a coherent memory system. In some embodiments, the memory 250 is an L3 cache. The memory 250 takes instructions from the communication detector 230 to load data 270 with address 272 into a cache 218, 220. The memory 250 is comprised of data 270 that is accessed by an address 272. The caches 218, 220 are part of a coherent address system or have separate address systems.

The memory traffic 280 includes instructions to the memory 250. For example, the memory traffic 280 may include write requests, read requests, write back requests, etc.

In some embodiments, there is a direct memory connection between the cache 218 and cache 220. The communication detector 230 monitors the memory traffic 280 between the two caches 218, 220 and sends commands to move data 270 between the two caches 218, 220.

Figure 3A:
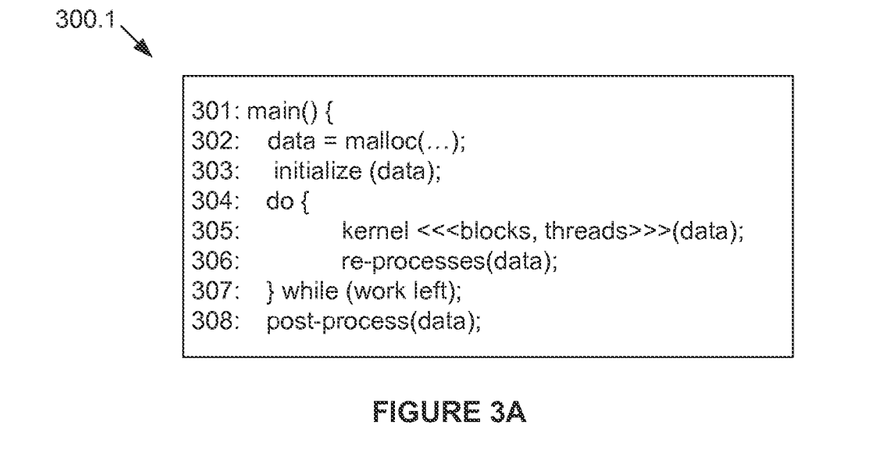
FIGS. 3A and 3B schematically illustrate example computer pseudo-code that CPU and GPU may execute, in accordance with some embodiments.
Figure 3B:
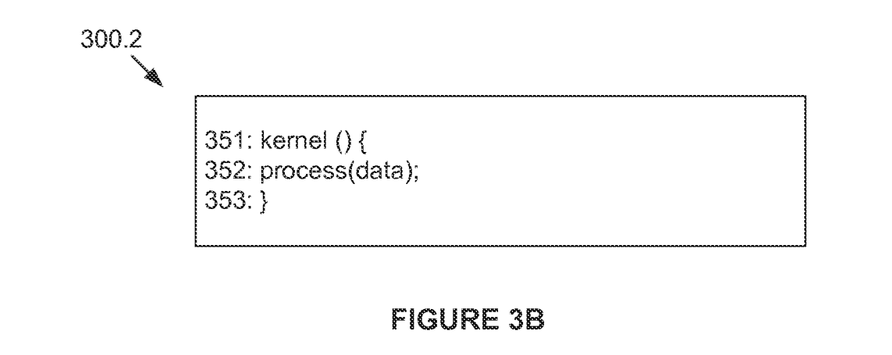
Figure 4A:
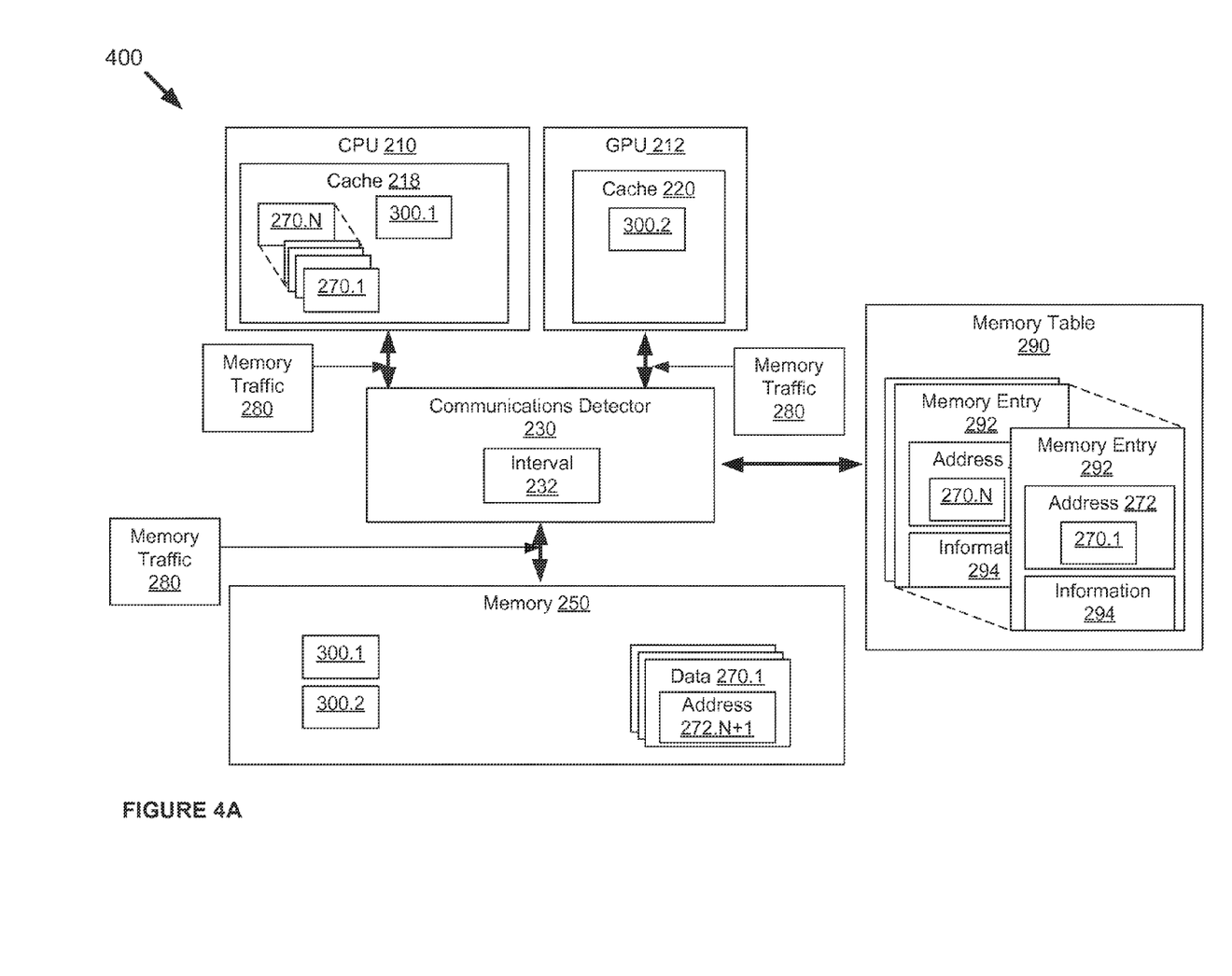
FIGS. 4A and 4B schematically illustrate the movement of data between the CPU and the GPU.
Figure 4B:
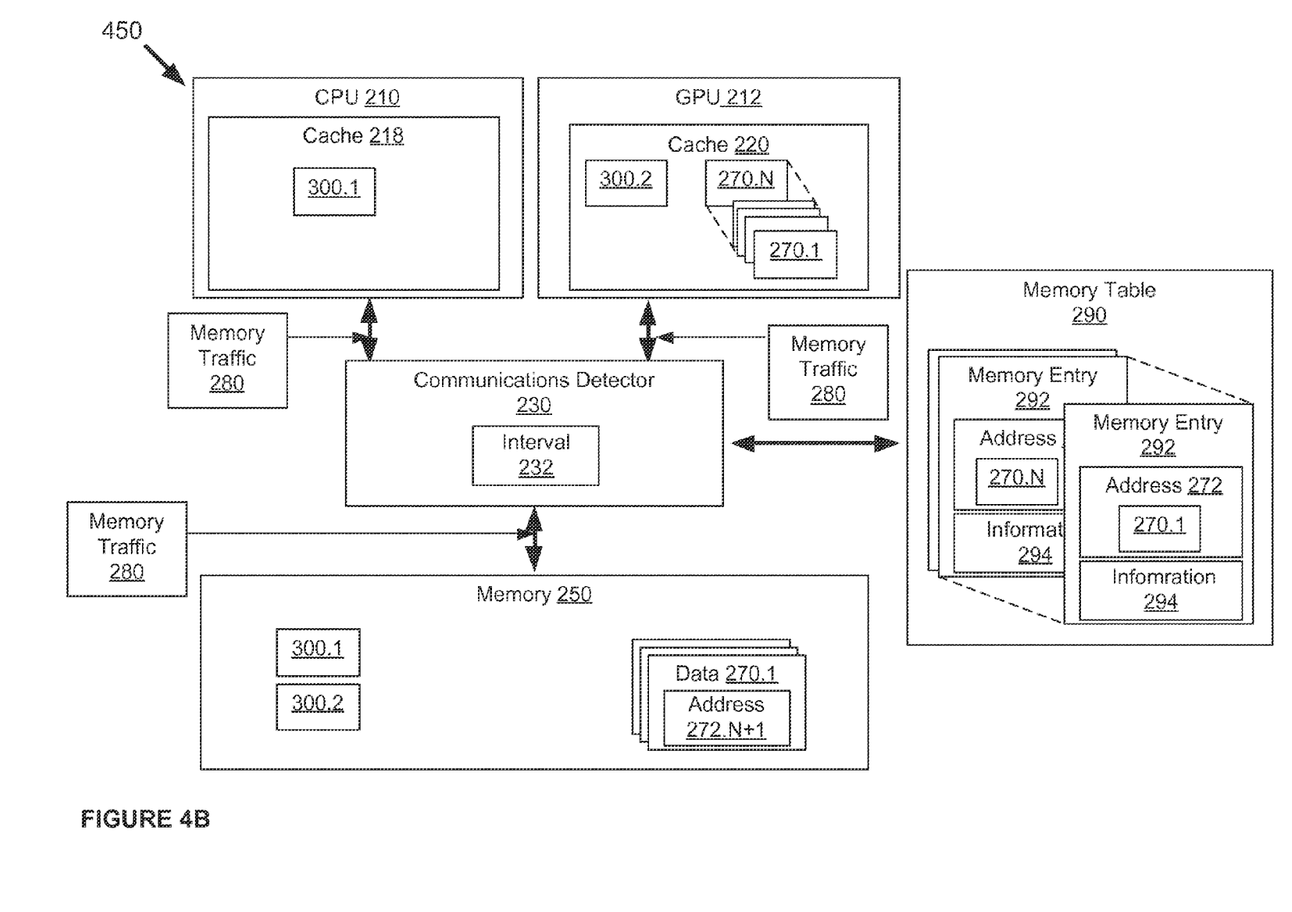

FIGS. 3A and 3B schematically illustrate example blocks of computer pseudo-code that CPU 210 and GPU 212 execute, in accordance with some embodiments. FIGS. 4A and 4B schematically illustrate the movement of data between the CPU 210 and the GPU 212. FIGS. 3A, 3B 4A, and 4B are described in conjunction with one another. The CPU 210 begins by executing instruction "data= malloc( . . . )" 302, which allocates space in memory 250 for "data." "Data" may be, for example, an array of millions of numbers, which is stored in data 270.1 through 270.N. The CPU 210 continues with "initialize(data)" 303. In order for the CPU 210 to initialize the data, the CPU 210 requests the data be moved from the memory 250 to the CPU cache 218, which is illustrated in FIG. 4A. The data 270.1 to 270.N has been moved from the memory 250 to the cache 218 by the CPU 210 requesting the data 270.1 to 270.N. The communication detector 230 monitors the data 270 and keeps the memory table 290. For example, the communication detector 230 makes an entry for each of the data 270.1 through 270.N and associates information 294 with the data 270. The information 294 may include an indication that the CPU 210 requested the data 270.1 through 270.N and that the data 270.1 through 270.N is currently in the cache 218.

The CPU 210 continues with "do {" 304, which begins a do loop. The CPU 210 continues with "kernel<<<blocks, threads>>>(data)" 305. This command transfers control to the GPU 212. The GPU 212 continues with "kernel( ) {" 351, which is an indication of the beginning of the pseudo-code. The GPU 212 continues with "process(data)" 352. The GPU 212, for example, performs computation on the millions of numbers in data 270.1 through 270.N. The GPU 212 may be composed of many processing elements that share a cache 220. In order for the GPU 212 to process the data, the cache 220 of the GPU 212 requests the data 270.1 through 270.N. Since the data 270.1 through 270.N is not in the cache 220 when the GPU 212 requests the data 270.1 through 270.N, the cache 220 requests the data 270.1 through 270.N. The data 270.1 through 270.N may be moved from the cache 218 of the CPU 210 to the cache 220 of the GPU 212. For example, a directory (not illustrated) of the memory 250 sends a request for the cache 218 to release the data 270.1 through 270.N, and then sends the data 270.1 through 270.N to the cache 220. FIG. 4B illustrates that the data 270.1 to 270.N has been moved from the cache 218 of the CPU 210 to the cache 220 of the GPU 212 by the GPU 212. Some or all of the data 270.1 to 270.N may have been moved from the cache 218 of the CPU 210 to memory 250, and then from memory 250 to the cache 220 of the GPU 212. The communication detector 230 monitors the data 270.1 through 270.N movement and indicates in the information 294 that the data 270.1 through 270.N was moved to the cache 220 of the GPU 212. In some embodiments, the communication detector 230 determines the interval 232.

The GPU 212 continues with "}" 353, which transfers control back to the CPU 210. The CPU 210 continues with "re-process(data)" 306. The CPU 210 requests the data 270.1 through 270.N again to re-process the data 270.1 through 270.N. The data 270.1 through 270.N is moved from the cache 220 of GPU 212 to the cache 218 of the CPU 210. The data 270.1 through 270.N may return to the position illustrated in FIG. 4A. The communication detector 230 monitors the data 270.1 through 270.N movement and indicates in the status 294 that the data 270.1 through 270.N was moved from the cache 220 of the GPU 212 to the cache 218 of the CPU 210.

The CPU 210 continues with "{while (work left)" 307. In some embodiments, there is work left in which case the CPU 210 would return to 304.

The CPU 210 continues as before with "do {" 304, which is the start of a do loop. The CPU 210 continues with "kernel<<block, threads>>>(data)" 305. This command, as before, transfers control to the GPU 212. The GPU 212 continues with "kernel( ) {" 351, which is an indication of the beginning of the pseudo-code. The GPU 212 continues with "process(data)" 352. The GPU 212, for example, performs computation on millions of numbers, as before. In order for the GPU 212 to process the data, the GPU 212 requests the data 270.1 through 270.N. FIG. 4B illustrates that the data 270.1 to 270.N has been moved from the cache 218 to the cache 220 of the GPU 212.

In some embodiments, the communication detector 230 detects that the GPU 212 was going to begin processing the data 270.1 through 270.N by determining that the interval 232 between the processing of the data 270.1 through 270.N by the CPU 210 and the GPU 212 indicated that the GPU 212 may begin processing the data 270.1 through 270.N. The communication detector 230 monitors the data 270.1 through 270.N movement and indicates in the information 294 that the data 270.1 through 270.N was moved to the cache 220 of the GPU 212.

The GPU 212 continues with "}" 353, which indicates the end of the pseudo-code 300.2. Control returns to the CPU 210. The CPU 210 continues with "re-process(data)" 306. The communication detector 230 may move the data 270.1 through 270.N to the cache 218 of the CPU 210 so that when the CPU 210 requests the data 270.1 through 270.N the data is already in the cache 218 of the CPU 210. In some embodiments, only some of the data 270.1 through 270.N is "re-process(data)" and moved to the cache 218 of the CPU 210.

The CPU 210 continues with "post-process(data)" 308. The CPU 210 processes some or all of the data 270.1 through 270.N. In some embodiments, new data 270 may be generated and processed by the CPU 210. The communication detector 230 may move some or all of the data 270.1 through 270.N that is processed by the CPU 210 at 308. The pseudo-code 300.1 may end. The pseudo-code 300.1 could continue to loop at 307 to return to 304 in which case the data 270.1 through 270.N would continue to move back and forth between the cache 218 (FIG. 4A) and cache 220 (FIG. 4B). The communication detector 230 continues to monitor the memory traffic 280 and improve the interval 232 based on the data 270.1 through 270.N moving back and forth between the caches 218, 220. Additionally, the communication detector 230 may monitor the memory traffic 280 and determine based on other indicators to move the data 270.1 through 270.N to the other cache 270.1 through 270.N. For example, the communication detector 230 may determine that when a different data item (not illustrated) is requested by the cache 218 that the CPU 210 is done with the data 270.1 through 270.N and thus the data 270.1 through 270.N should be moved to the cache 220.

Figure 5:
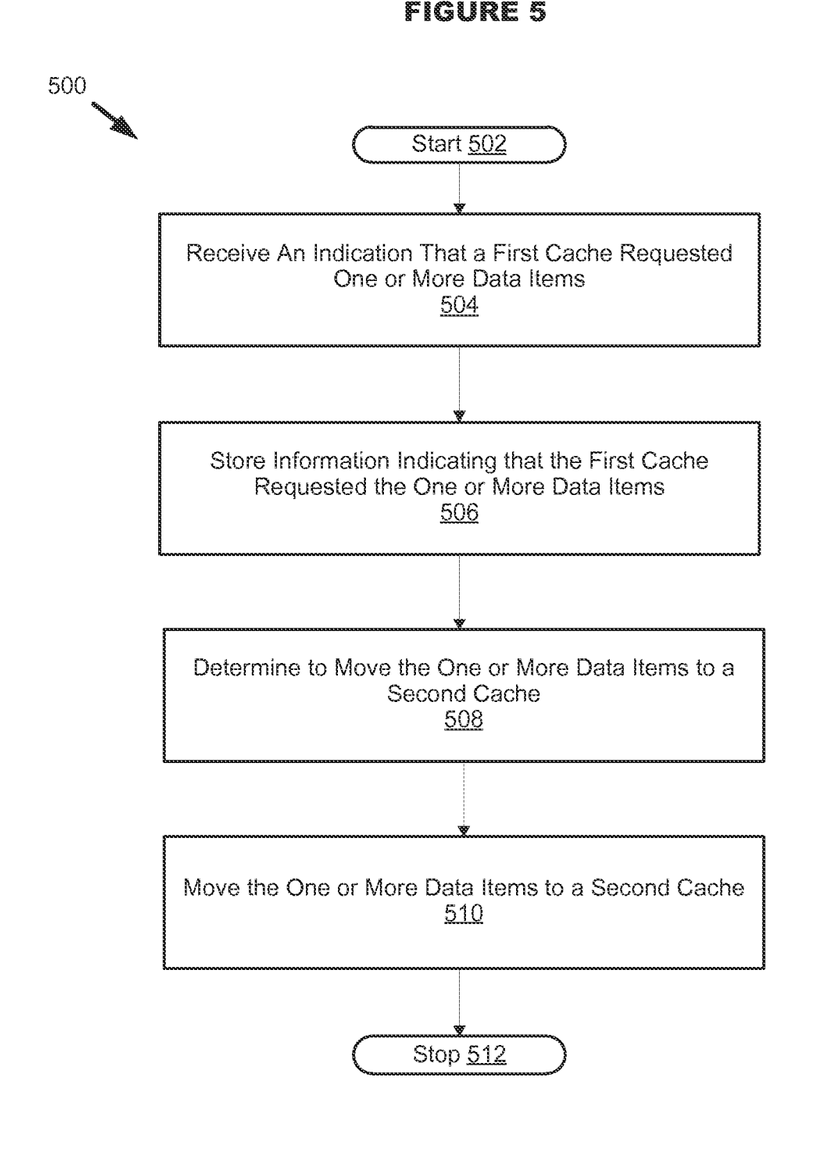
FIG. 5 illustrates a method of moving data into a cache in a heterogeneous processor system.

FIG. 5 illustrates a method 500 of moving data into a cache in a heterogeneous processor system. The method 500 begins with start 502. The method 500 continues with receiving an indication that a first cache requested a plurality of data items. For example, referring to FIGS. 4A and 4B, the CPU 210 may request data 270.1 through 270.N, which is not present in the cache 218. The cache 218 requests the data 270.1 through 270.N from the memory 250. The communication detector 230 detects the memory traffic 280 of the requests from the cache 218 to the memory 250 of the data 270.1 and 270.N.

The method 500 continues with storing information indicating that the first cache requested the one or more data items 506. For example, the communications detector 230 records in the memory table 290 that data 270.1 through 270.N were moved to the cache 218. The communications detector 230 records a time when the data 270.1 through 270.N was moved to the cache 218. The communication detector 230 may store other information 294 such as whether or not a data 210 has been written to or not. In some embodiments, the communication detector 230 monitors and stores kernel completion signals. In some embodiments, some or all of the data 270.1 through 270.N is moved back and forth between caches 218 and 220. The communications detector 230 may determine an interval 232 of time of how long the data 270.1 through 270.N was moved to the cache 218 and when the data 2701.1 through 270.N was moved to the cache 220. In some embodiments, the communications detector 230 determines the interval 232 based on monitoring synchronized memory accesses. In some embodiments, the communications detector 230 determines the interval 232 based only on monitoring synchronized memory accesses. In some embodiments, the communication detector 230 determines the interval 232 based on monitoring kernel completion signals.

The method 500 continues with determining to move the one or more data items to a second cache 508. For example, the communications detector 230 determines to move the data 270.1 through 270.N based on the interval 232. For example, the communications detector 230 determines that the interval 232 has occurred and waits some period of time past the interval 232 and then determines to move the data 270.1 through 270.N. The communications detector 230 may determine to move the data 270.1 through 270.N after determining that memory traffic 280 from the cache 220 included a request for one of the data 270.1 through 270.N. For example, the cache 220 may make a request for data 270.1 when 270.1 through 270.N are resident in cache 218. The communications detector 230 may determine to move the data 270.2 through 270.N to the cache 220 based on monitoring the memory traffic 280 and receiving an indication that cache 220 requested data 270.1. The communications detector 230 may determine to move the data 270.2 through 270.N to the cache 220 based on a kernel completion signal. For example, the communications detector 230 detects that a kernel completion signal is received from a kernel running in a cache 220 that has been accessing the data 270.2 through 270.N, and based on receiving the kernel completion signal, the communication detector 230 moves at least some of the data 270.2 through 270.N to a cache 218.

The communication detector 230 may monitor the memory traffic 280 and determine that data 270.1 through 270.N should be moved to the cache 220 when the data 270.1 through 270.N has been written back. For example, the communications detector 230 may detect that data 270.1 through 270.100 was written back and based on this determination load the cache 220 with data 270.1 through 270.100.

The method 500 continues with moving the one or more data items to a second cache 510. For example, the communication detector 230 makes a request to the memory 250 that data 270.1 through 270.N be loaded into the cache 220. In some embodiments, the communication detector 230 moves a portion of the data 270.1 through 270.N to the cache 220 and then later moves a second portion of the data 270.1 through 270.N to the cache 220. For example, the communication detector 230 moves data 270.1 through 270.100 to the cache 220 and then later moves 270.101 through 270.200 to the cache 220. The communications detector 230 may move the data 270.1 through 270.N in portions based on estimating how long the GPU 212 will require the data 270.1 through 270.N be in the cache 220.

Figure 6:
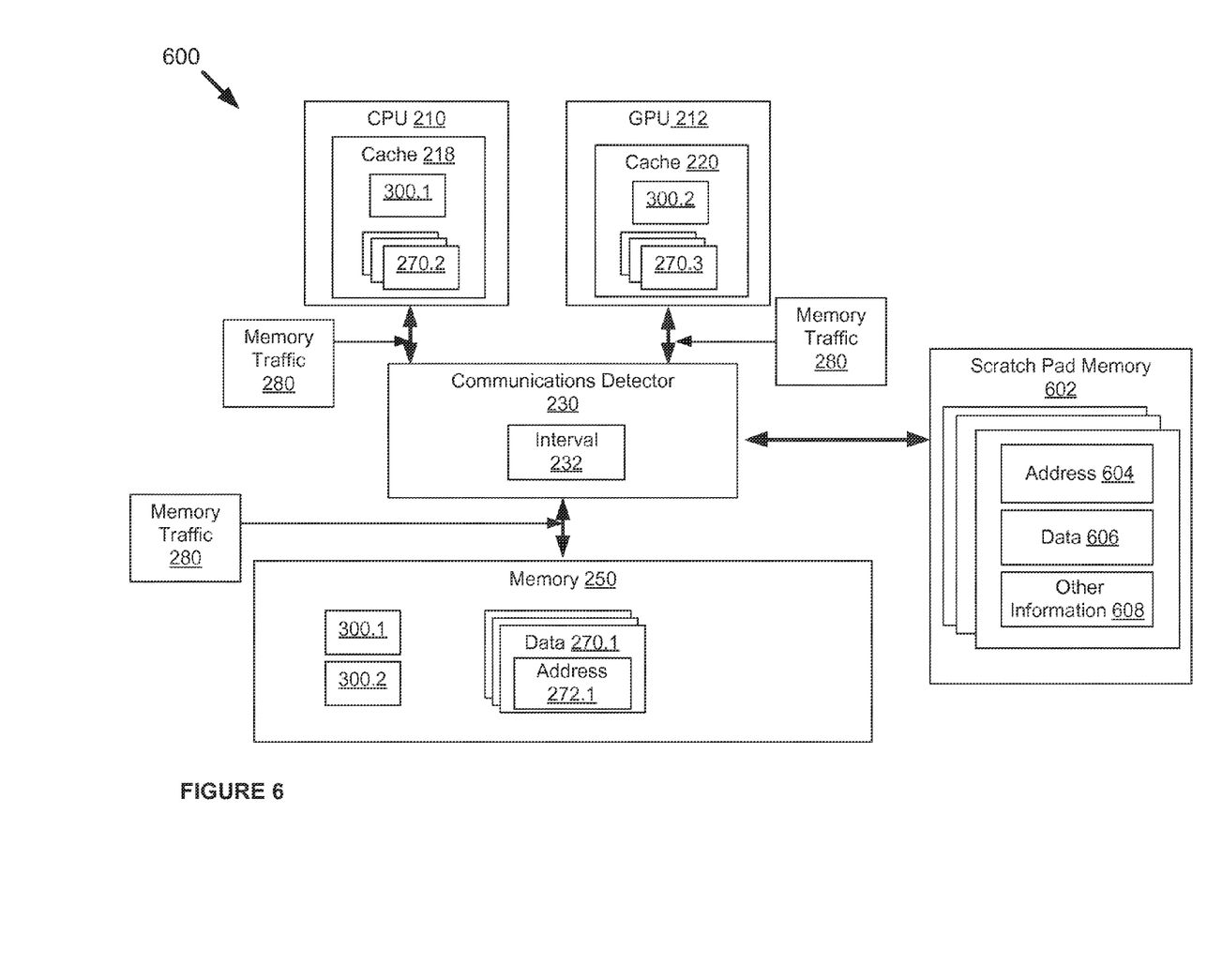
FIG. 6 schematically illustrates a system of moving data into a cache in a heterogeneous processor system.

FIG. 6 schematically illustrates an example system 600 of moving data into a cache in a heterogeneous processor system. The system 600 includes a scratch pad memory 602. The scratch pad memory 602 is configured to record the address 604, the actual data 606, as well as other information 608. The CPU 210 and GPU 212 are configured so that when they write data 270 in their cache 218, 220, respectively, the data 270 will also be written to the actual data 606 of scratch pad memory 602 for some selected data 270.1 through 270.N. The data 270 may reside in the cache 218, 220 and the scratch pad memory 602. The data 270 in the scratch pad may be updated if the owner cache 218, 220 writes again to the data 270 before communications detector 230 moves the data 270. The communications detector 230 may move the data 270.1 through 270.N from the scratch pad to one of the caches 218, 220 and invalidate the data 270.1 through 270.N in the other cache 218, 220 when the data 270.1 through 270.N is consumed by the other cache 218, 220, or when "kernel( )}" 251 finishes. The other information 608 may include an indication of which cache 218, 220 owns the data 606 and whether or not the data 606 is valid.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a graphics processing unit (GPU), a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium is a non-transitory computer-readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of moving a plurality of data items, the method comprising:
   receiving a first indication that a first cache received the plurality of data items;
   receiving a request, by a second cache, for the plurality of data items received at the first cache;
   storing first information indicating a time when the first cache received the plurality of data items, wherein the first information includes an address for each of the plurality of data items;
   storing second information indicating a time when the second cache requested the plurality of data items, wherein the second information includes the address for each of the plurality of data items;
   moving the plurality of data items from the first cache to the second cache;
   determining a time interval corresponding to an amount of time from when the first cache received the plurality of data items to when the second cache requested the plurality of data items;
   receiving a second indication that the first cache again received the plurality of data items after the plurality of data items were moved to the second cache;
   storing, based on the second indication, information indicating when the first cache again received the plurality of data items; and
   moving the plurality of data items from the first cache to the second cache based on the time interval and when the first cache again received the plurality of data items.

2. The method of claim 1, further comprising:
   updating the time interval based on an additional amount of time from when the first cache again received the plurality of data items to when the second cache again requested the plurality of data items; and
   moving the plurality of data items to the second cache based on the updated time interval and when the first cache again received the plurality of data items.

3. The method of claim 1, wherein the request by the second cache is at least one of: a memory read request, a memory read/write request, a synchronized memory read request, a synchronized memory read/write request, and a kernel completion signal.

4. The method of claim 1, wherein determining further comprises:
   receiving a third indication that a subset of the plurality of data items have been modified in the first cache; and
   moving the plurality of data items to the second cache based on receiving the third indication.

5. The method of claim 1, wherein the first cache is in communication with a first processor of a first type and the second cache is in communication with a second processor of a second type different from the first processor of the first type.

6. A processing device for moving a plurality of data items, the processing device comprising:
   a first cache in communication with a first processor of a first type;
   a second cache in communication with a second processor of a second type;
   a communication detector in communication with the first processor of the first type and the second processor of the second type and configured to:
   receive a first indication that the first cache received the plurality of data items;
   receive a request, by the second cache for the plurality of data items received at the first cache;
   store first information indicating a time when the first cache received the plurality of data items, wherein the first information includes an address for each of the plurality of data items;
   store second information indicating a time when the second cache requested the plurality of data items, wherein the second information includes the address for each of the plurality of data items;
   move the plurality of data items from the first cache to the second cache;
   determine a time interval corresponding to an amount of time from when the first cache received the plurality of data items to when the second cache requested the plurality of data items;
   receive a second indication that the first cache again received the plurality of data items after the plurality of data items were moved to the second cache;
   store, based on the second indication, information indicating when the first cache again received the plurality of data items; and
   move the plurality of data items from the first cache to the second cache based on the time interval and when the first cache again received the plurality of data items.

7. The processing device of claim 6, wherein the communication detector is further configured to:
   update the time interval based on an additional amount of time from when the first cache again received the plurality of data items to when the second cache again requested the plurality of data items; and
   move the plurality of data items to the second cache based on the updated time interval and when the first cache again received the plurality of data items.

8. The processing device of claim 6, wherein the request by the second cache is at least one of: a memory read request, a memory read/write request, a synchronized memory read request, a synchronized memory read/write request, and a kernel completion signal.

9. The processing device of claim 6, wherein determining further comprises:
   receiving a third indication that a subset of the plurality of data items have been modified in the first cache; and
   moving the plurality of data items to the second cache based on receiving the third indication.

10. The processing device of claim 6, wherein the communication detector is further configured to:
    move a first portion of the plurality of data items to the second cache;

wait a period of time; and move a remaining portion of the plurality of data items to the second cache.

11. The method of claim 1, further comprising moving the plurality of data items from the first cache to the second cache before the second cache requests the data based on when the first cache again received the plurality of data items and the time interval.

12. The method of claim 1, further comprising:

determining that the time interval has elapsed from when the first cache again received the plurality of data items; and moving the plurality of data items from the first cache to the second cache within a period of time after the time interval has elapsed.

* * * * *